E. Wassell
Horseshoe Machine
No. 85,414. Patented Dec. 29, 1868.

Witnesses:
A. C. Johnston
Wesley Johnston

Inventor:
Edwin Wassell

E. WASSELL.
MACHINE FOR MAKING HORSESHOES.

*The Schedule referred to in these Letters Patent and making part of the same.*

*To all whom it may concern:*

Be it known that I, EDWIN WASSELL, of Pittsburg, in the county of Allegheny, and State of Pennsylvania, have invented a new and useful Improvement in Machines for Making Horse-Shoes; and I do hereby declare that the following is a full, clear, and exact description thereof, reference being had to the accompanying drawings, and to the letters and figures of reference marked thereon.

The nature of my invention consists in the combination and arrangement of a former, swaging-die, guides, cutter, friction-rollers, and cams, constructed, combined, arranged, and operating as hereinafter described.

To enable others skilled in the art to make and use my invention, I will proceed to describe its construction and operation.

In the accompanying drawings, which form part of my specification—

Figure 1:
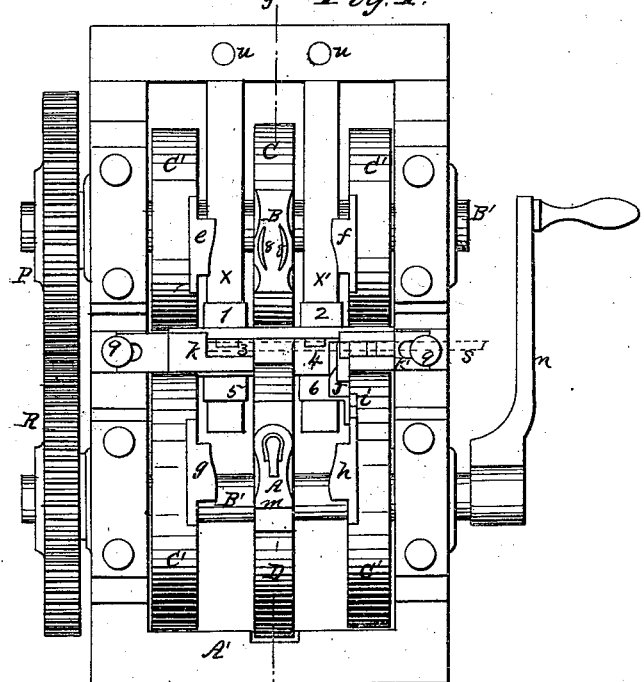
Figure 1 is a top view or plan of my improvement in horse-shoe machines.
Figure 2:
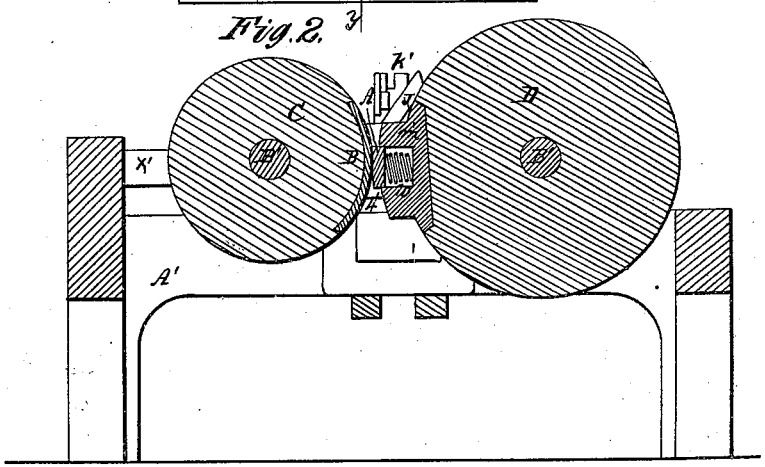
Figure 2 is a vertical section of the same when cut through at y of fig. 1.

In the drawings, A' represents the frame, which is made of cast-iron, and provided with suitable bearings for the shafts B', upon which are placed wheels C, D, C', and D'. These wheels are revolved in the desired direction, and at the proper speed, through the medium of the gear-wheels P and R, which are of equal diameter, and mesh into each other.

The wheel D is provided with former A, which is fitted in a cavity made in the part marked m, which is secured on the periphery of the wheel D, the former A being held out in the proper position through the medium of a spring, o.

The sides and one end of the former A correspond to the form of the inner edge of the horse-shoe.

The wheel C is provided with a die, B, with projections, 8, on the face of it. These projections form the grooves in the face of the horse-shoe, for the heads of the nails used for securing the shoe on the hoof of the horse.

The wheels C' and D' are provided with cams, e, f, g, and h, the form of which is clearly shown in fig. 1.

Between the wheel C and D and C' and D' are placed arms X and X', which are pivoted to one end of the frame A' at the points marked u. On these arms are placed the friction-rollers 1, 2, 3, 4, 5, and 6.

The cams e, f, g, and h act against the friction-rollers 1, 2, 5, and 6, and thereby bring the friction-rollers 3 and 4 into position for forming the outside edge of the horse-shoe.

The guides k and k' are adjustable, and are held in position through the medium of the set-screws 9.

The cutter J is pivoted at its lower end to the guide, so that it will fall back of its own gravity, and is made operative, for cutting off the iron for each horse-shoe, through the medium of the cam i on the wheel D'.

As the skilful mechanic will, from the foregoing description, and by reference to the accompanying drawings, readily understand the construction and arrangements of my improvement, and the relation that the several parts bear to each other, I will therefore, without further description of its construction, proceed to the operation, which is as follows:

Power being applied to crank n, which will revolve the shafts B', and the wheels attached thereto, iron of the proper width and thickness is fed into guides on its edge, and the revolving of the wheels C and D and C' and D' will cause the end of former A to come down against the upper edge of the bar of iron, indicated by the red lines at s, and the cam i will force up the cutter J, which will cut off the iron for forming the shoe.

The cams e, f, g, and h will come against the friction-wheels 1, 2, 5, and 6, which will bring the friction-wheels 3 and 4 into position for forming the outside of the shoe. The former will force down the iron, and the rolls 3 and 4 will force the iron, as it is bent, against the sides of the former A. The die B will then, through the medium of the projections 8, make the grooves in the face of the shoe, and force back the former A, which will allow the finished shoe to drop from the machine, which is again ready to form another shoe.

Having thus described the nature, construction, and operation of my improvement,

What I claim as of my invention, is—

The former A and die B, when combined with the wheels C and D, friction-rollers 1, 2, 3, 4, 5, and 6, cams e, f, g, and h, pivoted arms X and X', cam i, cutter J, and guides k and k', the whole being constructed, arranged, and operating substantially as herein described, and for the purpose set forth.

EDWIN WASSELL.

Witnesses:
A. C. JOHNSTON,
JAMES J. JOHNSTON.